United States Patent
Miyamae et al.

(10) Patent No.: US 12,301,721 B2
(45) Date of Patent: May 13, 2025

(54) STORAGE MEDIUM, CONSIDERATION DISTRIBUTION METHOD, AND INFORMATION MANAGEMENT DEVICE

(71) Applicant: Fujitsu Limited, Kawasaki (JP)

(72) Inventors: Takeshi Miyamae, Kawasaki (JP); Shenbin Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 193 days.

(21) Appl. No.: 18/144,257

(22) Filed: May 8, 2023

(65) Prior Publication Data
US 2024/0056304 A1     Feb. 15, 2024

(30) Foreign Application Priority Data
Aug. 9, 2022  (JP) ................. 2022-127475

(51) Int. Cl.
H04L 9/32 (2006.01)
H04L 9/08 (2006.01)

(52) U.S. Cl.
CPC .......... H04L 9/3221 (2013.01); H04L 9/0869 (2013.01)

(58) Field of Classification Search
CPC ............................ H04L 9/0869; H04L 9/3221
See application file for complete search history.

(56) References Cited

U.S. PATENT DOCUMENTS

| | | | |
|---|---|---|---|
| 10,735,205 B1 * | 8/2020 | Wentz | H04L 9/3257 |
| 11,232,439 B2 * | 1/2022 | Westland | G06Q 20/383 |
| 2011/0208560 A1 * | 8/2011 | Najmi | G06Q 10/06 705/7.31 |
| 2019/0268312 A1 * | 8/2019 | Ma | H04L 63/0435 |
| 2019/0332807 A1 * | 10/2019 | LaFever | H04L 63/0407 |
| 2019/0349426 A1 * | 11/2019 | Smith | H04L 9/3239 |

(Continued)

FOREIGN PATENT DOCUMENTS

| | | |
|---|---|---|
| CN | 113411189 A | 9/2021 |
| JP | 2006-041836 A | 2/2006 |

(Continued)

OTHER PUBLICATIONS

Extended European Search Report issued Jan. 17, 2024 in corresponding European Patent Application No. 23172043.4, 8 pages.

(Continued)

Primary Examiner — Gary S Gracia
(74) Attorney, Agent, or Firm — XSENSUS LLP (57) ABSTRACT

A storage medium storing an information management program that causes a computer to execute a process that includes acquiring a first cumulative consideration amount from a most upstream process in a plurality of processes included in a supply chain to a first process; generating a consideration amount commitment by concealing the first cumulative consideration amount by using a random number; registering the consideration amount commitment in a blockchain; generating a consideration amount proof that is a zero knowledge proof that proves validity of the second cumulative consideration amount without disclosing the second cumulative consideration amount; and notifying the second process of the second cumulative consideration amount, the random number, and the consideration amount proof.

12 Claims, 5 Drawing Sheets

(56) References Cited

U.S. PATENT DOCUMENTS

| | | | | |
|---|---|---|---|---|
| 2020/0334708 A1* | 10/2020 | Knox | ................... | G06Q 20/123 |
| 2021/0158039 A1* | 5/2021 | Dittmann | .............. | H04L 9/3278 |
| 2022/0038289 A1* | 2/2022 | Huang | ................... | H04L 63/126 |
| 2022/0051261 A1* | 2/2022 | Vetas | ................... | G06Q 30/018 |
| 2022/0284446 A1* | 9/2022 | Kind | ................... | G06Q 30/018 |
| 2024/0056304 A1* | 2/2024 | Miyamae | .................. | H04L 9/50 |

FOREIGN PATENT DOCUMENTS

| | | |
|---|---|---|
| JP | 2020-515885 A | 5/2020 |
| JP | 2022-510790 A | 1/2022 |
| WO | 2019/072300 A2 | 4/2019 |
| WO | 2020/123591 A1 | 6/2020 |

OTHER PUBLICATIONS

Giulio Malavolta, et al.; "Multi-Hop Locks for Secure, Privacy-Preserving and Interoperable Payment-Channel Networks", IACR, International Association for Cryptologic Research vol. 20180523:022742 May 17, 2018 (May 17, 2018), pp. 1-28, XP061025781, Retrieved from the Internet: URL:http://eprint.iacr.org/2018/472.pdf [retrieved on May 17, 2018].

* cited by examiner

STORAGE MEDIUM, CONSIDERATION DISTRIBUTION METHOD, AND INFORMATION MANAGEMENT DEVICE

CROSS-REFERENCE TO RELATED APPLICATION

This application is based upon and claims the benefit of priority of the prior Japanese Patent Application No. 2022-127475, filed on Aug. 9, 2022, the entire contents of which are incorporated herein by reference.

FIELD

The embodiment discussed herein is related to a storage medium, a consideration distribution method, and an information management device.

BACKGROUND

Since before, in traceability management in a supply chain, it is known to apply a distributed ledger technology using a blockchain and a technology of managing a smart contract in which a transaction condition is described in a distributed ledger. A virtual economic zone based on distribution of intangible value using such a mechanism is referred to as a social chain or the like.

In recent years, environmental problems such as climate change, industrial water pollution, and mass use of water have come into focus, and it is desirable to encourage participants in the supply chain to change their consciousness and modify their behavior to reduce environmental loads. Thus, efforts have been made to achieve a virtual economic zone that enriches the world by indexing activities that have not been recognized as value so far and distributing the value. For example, information such as an amount of $CO_2$ emissions at each stage of the supply chain is included in a product as a token having intangible value, and circulated throughout the entire supply chain from a producer to a seller and from the seller to a consumer. By using such a social chain, both companies and consumers change their behavior so as to produce better results for an environment and the entire society by dynamics of virtual economy due to transactions or the like that evaluate the intangible value.

However, the supply chain has a problem that it is difficult for a consumer who wants to buy a product that is slightly more valuable but is better for the environment to know under what environmental contribution the product the consumer intends to buy has been manufactured. Besides, the supply chain has a problem that it is difficult for a company to recover a cost of environmental contribution such as reduction of an amount of $CO_2$ emissions and use of an ecological material without unbalance among companies, and it is difficult to lead to continuous environmental contribution.

Thus, in the social chain, the following two perspectives are considered to solve these problems. One is a technology that visualizes and distributes intangible value. For example, a trail management technology that visualizes intangible value produced by the supply chain makes it possible to attract interest of consumers in the intangible value. Furthermore, a token generation technology that generates a token based on trail information makes it possible to provide consumers and investors with opportunities for investment in intangible value. Another one is a technology of appropriate consideration return for intangible value. For example, a consideration return technology that distributes tokens based on trail information makes it possible to implement appropriate return of a consideration for intangible value to suppliers.

As a mechanism based on these two perspectives, a mechanism has been proposed in which a consideration according to intangible value is returned from consumers to the supply chain, and the consideration is distributed according to value of each process in the supply chain by a smart contract managed in the blockchain.

In such a system that distributes the consideration according to the value of each process in the supply chain by the smart contract, the consideration distribution may be performed along a route of the supply chain. One of reasons for this is that direct receipt by each supplier of the consideration from the consumers is needed in a case where a trusted third party is not assumed. Furthermore, another one of the reasons is that, in a case where cumulative value is concealed from a viewpoint of privacy protection, information regarding cumulative value of all but one upstream supplier is concealed from each supplier, and therefore, the consideration distribution along the route of the supply chain is easy as the mechanism. Furthermore, it is also one of the reasons that, even in a case where the cumulative value is not concealed, it is advantageous to be able to perform the consideration distribution along the route of the supply chain in terms of a remittance fee, scalability, and the like.

Note that, as an information management technology using a blockchain, there has been proposed a technology in which an advertiser records a product sales result in the blockchain in a form of a zero knowledge proof, and a viewer proves an achievement of an advertisement by linking an advertisement result and the product sales result. Furthermore, there has been proposed a technology in which an edge node is arranged for each base station area of mobile phone communication to form a blockchain, and a supplier requests an edge node of its own base station area for a smart contract. Furthermore, there has been proposed a technology in which, in a seller system using a blockchain, accounts of a seller and a customer are anonymized by using a zero knowledge proof. Furthermore, there has been proposed a technology in which consistency between a transaction amount and a change committed in a blockchain is ensured by using probabilistic homomorphic encryption and a zero knowledge proof. Moreover, there has been proposed a technology in which a plurality of sessions of zero knowledge interactive proof protocols performed in parallel is managed between a certifier device and a plurality of verifier devices for confidential information included in the certifier device.

U.S. Patent Application Publication No. 2020/0334708, U.S. Patent Application Publication No. 2022/0038289, Japanese National Publication of International Patent Application No. 2022-510790, Japanese National Publication of International Patent Application No. 2020-515885, and Japanese Laid-open Patent Publication No. 2006-041836 are disclosed as related art.

SUMMARY

According to an aspect of the embodiments, a non-transitory computer-readable storage medium storing an information management program that causes at least one computer to execute a process, the process includes acquiring a first cumulative consideration amount from a most upstream process in a plurality of processes included in a supply chain to a first process of the plurality of processes based on a second cumulative consideration amount from the most upstream process to the first process, a first cumulative value from the most upstream process to the first process, and a second cumulative value from the most upstream process to a second process which is one upstream process of the first process; generating a consideration amount commitment by concealing the first cumulative consideration amount by using a random number; registering the consideration amount commitment in a blockchain; generating a consideration amount proof that is a zero knowledge proof that proves validity of the second cumulative consideration amount without disclosing the second cumulative consideration amount; and notifying the second process of the second cumulative consideration amount, the random number, and the consideration amount proof.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In order to protect privacy, trail information in each process and a cumulative consideration up to one downstream process may be concealed. In this case, when consideration distribution is performed along the route of the supply chain, it is difficult to confirm validity of an amount of a consideration obtained in each process in a state where the amount of the consideration returned by consumers is concealed. For example, a supplier in charge of any process in the supply chain does not know, or may not trust, even if the supplier knows, an amount of a consideration received by a supplier of a downstream process or a value of cumulative value in another supplier other than the supplier of an upstream process. Therefore, it is difficult for the supplier to determine whether or not the obtained consideration is a fair amount in the entire supply chain. As described above, in the existing privacy technologies, it is difficult to ensure reliability of consideration distribution.

The disclosed technology has been made in view of the above, and an object thereof is to provide a consideration distribution program, a consideration distribution method, and an information management device that ensure reliability of a supply chain while protecting privacy.

In one aspect, an embodiment may ensure reliability of consideration distribution while protecting privacy.

Hereinafter, an embodiment of a consideration distribution program, a consideration distribution method, and an information management device disclosed in the present application will be described in detail with reference to the drawings. Note that the consideration distribution program, the consideration distribution method, and the information management device disclosed in the present application are not limited by the following embodiment.

Embodiment

Figure 1:
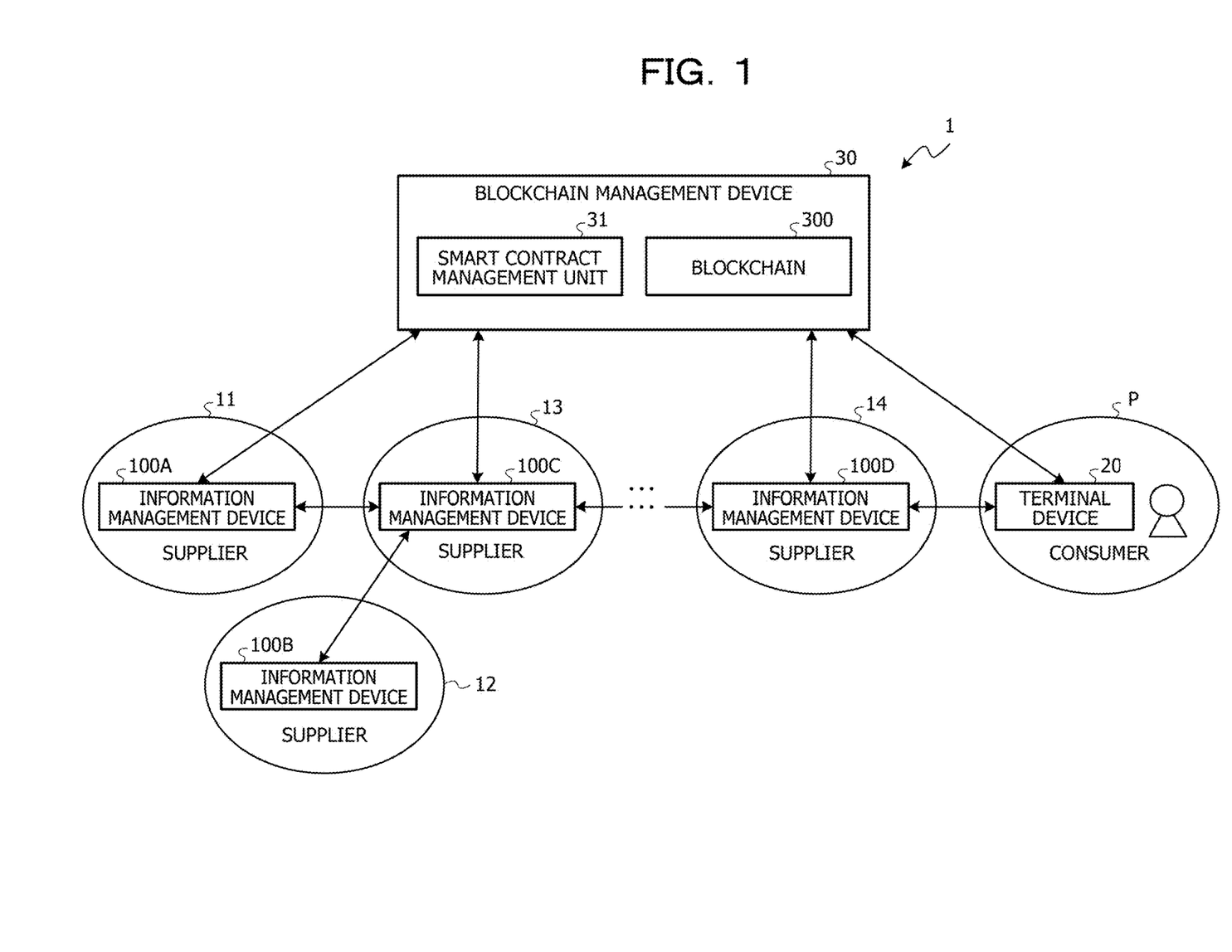
FIG. 1 is a diagram illustrating an example of a system configuration of a supply chain system.

FIG. 1 is a diagram illustrating an example of a system configuration of a supply chain system. A supply chain system 1 according to the present embodiment includes information management devices 100A to 100D respectively possessed by suppliers 11 to 14, a terminal device 20 possessed by a consumer P, and a blockchain management device 30. In the following description, the suppliers 11 to 14 will be referred to as the suppliers 10 in a case where no distinction is made. Furthermore, the information management devices 100A to 100D possessed by the respective suppliers 10 will be referred to as the information management devices 100 in a case where no distinction is made. In the following description, in a supply chain, a process (component) before a certain process (component) may be referred to as an upstream process (upstream component), and a process (component) after a certain process (component) may be referred to as a downstream process (downstream component).

The information management devices 100, the terminal device 20, and the blockchain management device 30 are coupled via a network and may communicate with each other. Furthermore, the suppliers 10 having a transaction relationship with each other in the supply chain, in other words, the supplier 11 and the supplier 13, the supplier 12 and the supplier 13, and the supplier 13 and the supplier 14 have a communication channel for directly transmitting and receiving data. For example, the information management device 100A and the information management device 100C, the information management device 100B and the information management device 100C, and the information management device 100C and the information management device 100D are coupled via the network. Furthermore, there is a communication channel for directly transmitting and receiving data between the supplier 14 of the most downstream process and the consumer P. For example, the information management device 100D and the terminal device 20 are coupled via the network.

FIG. 1 illustrates the four suppliers 11 to 14 and the information management devices 100A to 100D as an example, but the numbers of suppliers 10 and information management devices 100 are not particularly limited. Furthermore, a route of the supply chain may be branched or may not be branched.

In the supply chain system 1 of the present embodiment, trail information for each process of a product in the supply chain related to a certain product, a cumulative consideration amount provided from the consumer P, and a cumulative consideration amount in each process are concealed. Additionally, in a state where these pieces of information are concealed, the supplier 10 may confirm validity of the cumulative consideration amount provided from the supplier 10 of one downstream process. The validity of cumulative value is used when, for example, a certain supplier 10 confirms that the cumulative consideration amount provided from one downstream supplier 10 is appropriate.

The supply chain of the present embodiment means a series of processes in manufacturing processes from procurement of raw materials and components of the product to manufacturing, inventory management, sales, and delivery. Furthermore, value of each component of the product manufactured by the supply chain of the present embodiment is an example of value of a process of manufacturing a component among the manufacturing processes included in the supply chain. Furthermore, the value of the component of the present embodiment is an example of environmental value generated in the manufacturing process of the component. The environmental value may be, for example, an index indicating a degree of contribution to environmental maintenance or reduction in environmental loads.

The consumer P is provided with the product manufactured in the supply chain. Then, by using the terminal device 20, the consumer P pays a consideration for the provided product and cumulative value including accumulated intangible value added to the product. The consideration paid is distributed and paid to each of the suppliers 10 along the route of the supply chain.

The blockchain management device 30 is a device that manages a distributed ledger included in the supply chain system 1, and includes a plurality of devices, each of which is coupled by a peer to peer (P2P) method. The blockchain management device 30 includes a smart contract management unit 31 and a blockchain 300. The smart contract management unit 31 manages a smart contract stored in the blockchain 300. The blockchain 300 is used in the supply chain, and stores component information including a cumulative value commitment that is information obtained by concealing cumulative value and a cumulative value proof that is a zero knowledge proof proving validity of the cumulative value. Furthermore, the blockchain 300 stores a consideration commitment transmitted from each of the terminal device 20 and the information management devices 100.

The terminal device 20 acquires, by input from the consumer P, an amount of a consideration for the product provided to the consumer P from the supply chain and cumulative value including accumulated intangible value added to the product. In other words, the terminal device 20 acquires a cumulative consideration amount from the suppliers 11 and 12 of the most upstream process to the supplier 14 of the most downstream process. In the following description, an amount of a cumulative consideration from the most upstream process to one upstream process is referred to as an "upstream cumulative consideration amount". The upstream cumulative consideration amount in the consumer P is the amount of the cumulative consideration from the most upstream process to the most downstream process.

Then, the terminal device 20 generates a random number for the upstream cumulative consideration amount. Here, the terminal device 20 has a commitment function for generating a consideration amount commitment obtained by concealing the upstream cumulative consideration amount. Then, the terminal device 20 generates the consideration amount commitment by using the commitment function for the upstream cumulative consideration amount and the random number.

Thereafter, the terminal device 20 registers the generated consideration commitment in the blockchain 300. Moreover, the terminal device 20 notifies the information management device 100D of the supplier 14 of the most downstream process of the upstream cumulative consideration amount and the random number.

Next, a function of the information management device 100 in each supplier 10 will be described. The information management device 100 pays a consideration of an upstream cumulative consideration amount to the supplier 10 of one upstream process. Moreover, the information management device 100 proves validity of the upstream cumulative consideration amount to the supplier 10 of the one upstream process while concealing an amount of a consideration returned by the consumer P and all types of cumulative value in a midway path of distribution.

Figure 2:
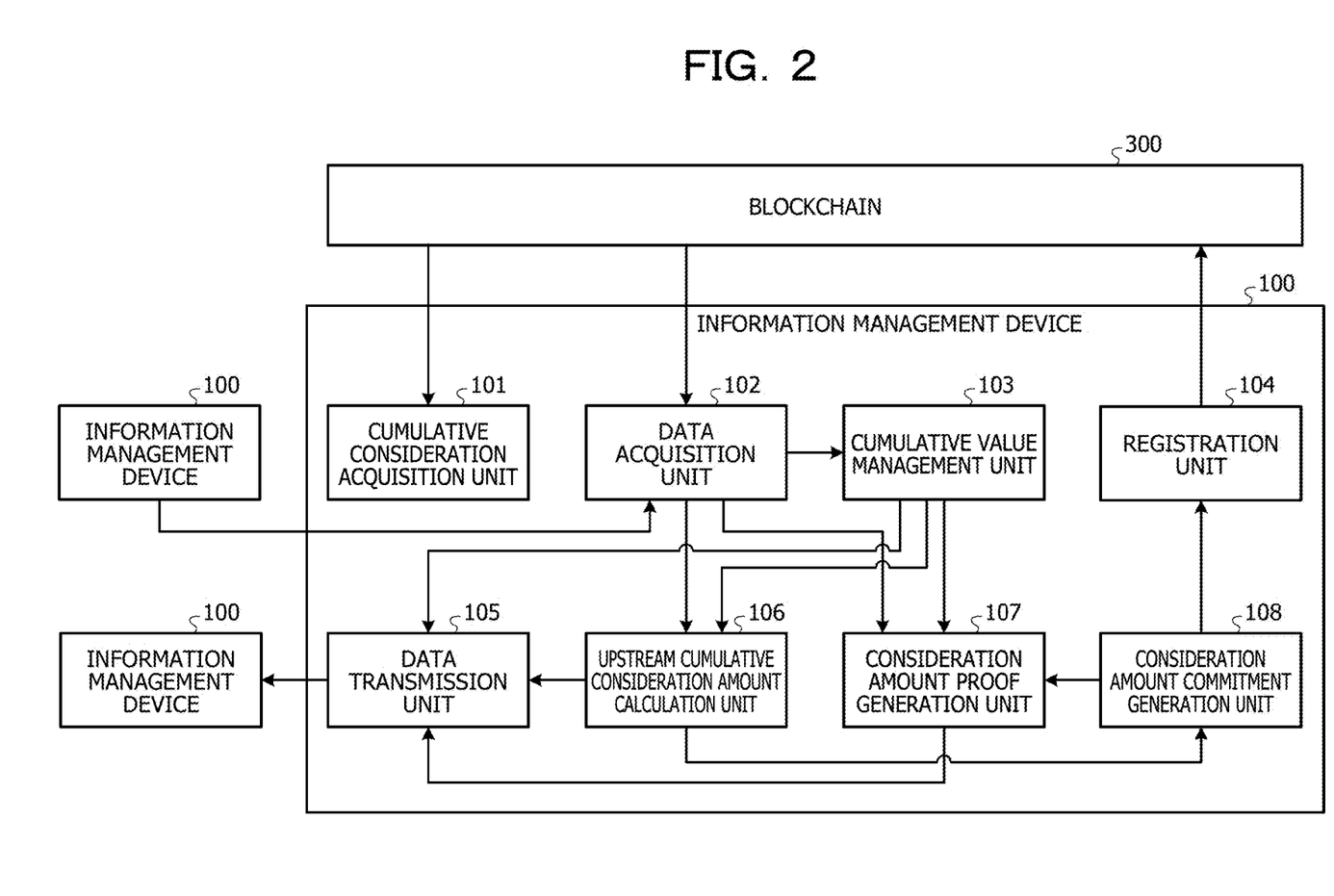
FIG. 2 is a block diagram of an information management device.

FIG. 2 is a block diagram of the information management device. As illustrated in FIG. 2, the information management device 100 includes a cumulative consideration acquisition unit 101, a data acquisition unit 102, a cumulative value management unit 103, a registration unit 104, a data transmission unit 105, an upstream cumulative consideration amount calculation unit 106, a consideration amount proof generation unit 107, and a consideration amount commitment generation unit 108.

The data acquisition unit 102 acquires, from the information management device 100 of one upstream process, cumulative value of an upstream supplier, which is cumulative value from the most upstream process to the one upstream process, and a random number generated by the information management device 100 of the one upstream process, at the time of provision of the product to the consumer P by the supply chain. Hereinafter, the random number generated by the information management device 100 of the one upstream process is referred to as an "upstream random number". Furthermore, the data acquisition unit 102 has trail information of an own process. The trail information is a trail indicating that a process has been performed, and includes various values measured in the own process. For example, the trail information includes information indicating environmental value such as a power consumption reduction amount which is power reduced when the same component as a component manufactured at a previous time has been manufactured this time, performance and durability of the component, and the like. Unit value is determined in a process performed at the supplier 10 of the own process. The trail information includes an electronic signature of a device or the like that has generated the trail information. The trail information is proved to be correct information by including the electronic signature.

Then, the data acquisition unit 102 outputs the trail information, the upstream random number, and the acquired cumulative value of the upstream supplier to the cumulative value management unit 103.

Furthermore, at the time of distribution of the consideration paid by the consumer P, the data acquisition unit 102 acquires, from the information management device 100 of one downstream process, an upstream cumulative consideration amount calculated by the information management device 100 of the one downstream process as a cumulative consideration amount from the most upstream process to the own process. Furthermore, the data acquisition unit 102 acquires a random number and a consideration amount proof generated by the information management device 100 in the one downstream process from the information management device 100 in the one downstream process. Note that, in the case of the information management device 100D of the most downstream process, the data acquisition unit 102 acquires the cumulative consideration amount and the random number from the terminal device 20 of the consumer P. Since the cumulative consideration transmitted from the consumer P is a consideration for the cumulative value, and validity thereof is easily confirmed by the supplier 10 of the most downstream process, the data acquisition unit 102 of the information management device 100D of the most downstream process does not need to receive the consideration amount proof. Hereinafter, the random number generated by the information management device 100 of the one downstream process is referred to as a "downstream random number".

Furthermore, the data acquisition unit 102 acquires, from the blockchain 300, a consideration amount commitment generated by the information management device 100 of the one downstream process.

Then, the data acquisition unit 102 outputs the cumulative consideration amount and the consideration amount proof to the upstream cumulative consideration amount calculation unit 106. Furthermore, the data acquisition unit 102 outputs, to the consideration amount proof generation unit 107, the cumulative consideration amount, the downstream random number, and the consideration amount commitment generated by the information management device 100 of the one downstream process.

The cumulative value management unit 103 calculates cumulative value, generates a cumulative value commitment, and generates a cumulative value proof at the time of provision of the product to the consumer P by the supply chain. Specifically, the cumulative value management unit 103 receives, from the data acquisition unit 102, input of the trail information, the upstream random number, and the acquired cumulative value of the upstream supplier. Then, the cumulative value management unit 103 calculates, by using the trail information, unit value of a process of manufacturing a component performed in the supplier 10 of the own process. Next, the cumulative value management unit 103 adds the calculated unit value and the cumulative value of the upstream supplier to calculate cumulative value. Moreover, the cumulative value management unit 103 generates a random number for the calculated cumulative value.

Next, the cumulative value management unit 103 uses the calculated cumulative value and the random number as input to generate a cumulative value commitment by using a commit function. The cumulative value commitment is information regarding concealed cumulative value and is a value of an unchangeable nature.

Next, the cumulative value management unit 103 generates a cumulative value proof that is a zero knowledge proof proving that the calculated cumulative value is a valid value. The zero knowledge proof is a technology that proves that "a proposition is true" without notifying information other than "the proposition is true". In other words, this cumulative value proof makes it possible to verify that cumulative value is a valid value in a state where the cumulative value in a specific supplier 10 is unknown from the cumulative value proof and the cumulative value commitment generated from information that only the specific supplier 10 may know. Specifically, the cumulative value management unit 103 generates the cumulative value proof by using the generated random number, the trail information, the cumulative value of the upstream supplier, and the upstream random number.

Thereafter, the cumulative value management unit 103 outputs the generated cumulative value commitment and cumulative value proof to the registration unit 104. Furthermore, the cumulative value management unit 103 outputs the cumulative value of the upstream supplier and the calculated cumulative value to the upstream cumulative consideration amount calculation unit 106. Furthermore, the cumulative value management unit 103 outputs the generated cumulative value and random number to the data transmission unit 105.

The cumulative consideration acquisition unit 101 acquires a cumulative consideration from the most upstream process to the own process by a remittance transaction addressed to the own device registered in the blockchain 300 by the information management device 100 of the one downstream process.

The upstream cumulative consideration amount calculation unit 106 receives input of the cumulative consideration amount and the consideration amount proof from the data acquisition unit 102. Next, the upstream cumulative consideration amount calculation unit 106 confirms validity of the cumulative consideration amount up to the own process based on the consideration amount proof. When the validity of the cumulative consideration amount up to the own process may be confirmed, the upstream cumulative consideration amount calculation unit 106 performs the following processing.

The upstream cumulative consideration amount calculation unit 106 receives, from the cumulative value management unit 103, input of the cumulative value of the upstream supplier and the cumulative value calculated by the cumulative value management unit 103. Then, the upstream cumulative consideration amount calculation unit 106 calculates a value obtained by dividing the cumulative consideration amount by the cumulative value of the own process and multiplying the cumulative value of the upstream supplier as an upstream cumulative consideration amount which is a cumulative consideration amount from the most upstream process to one upstream process. For example, in a case where the cumulative value of the upstream supplier is V1 and unit value of the own process is V2, the cumulative value up to the own process is V1+V2. Thus, in a case where the cumulative value up to the own process is V3, the upstream cumulative consideration amount calculation unit 106 calculates the upstream cumulative consideration amount by V3×(V1/V1+V2).

Thereafter, the upstream cumulative consideration amount calculation unit 106 outputs the calculated upstream cumulative consideration amount to the data transmission unit 105 and the consideration amount commitment generation unit 108.

The consideration amount commitment generation unit 108 receives input of the upstream cumulative consideration amount calculated by the upstream cumulative consideration amount calculation unit 106 from the upstream cumulative consideration amount calculation unit 106. Next, the consideration amount commitment generation unit 108 generates a random number for the upstream cumulative consideration amount. Here, the consideration amount commitment generation unit 108 has a commitment function for generating a consideration amount commitment. Then, the consideration amount commitment generation unit 108 uses the upstream cumulative consideration amount and the generated random number as input to generate the consideration amount commitment by using the commitment function. The consideration amount commitment is information regarding a concealed upstream cumulative consideration amount and is a value of an unchangeable nature. Thereafter, the consideration amount commitment generation unit 108 outputs the generated consideration amount commitment to the consideration amount proof generation unit 107 and the registration unit 104.

The consideration amount proof generation unit 107 generates a consideration amount proof. The consideration amount proof is a zero knowledge proof that proves, without disclosing the cumulative value, the cumulative consideration amount, and the downstream random number, validity of the upstream cumulative consideration by the cumulative consideration amount, the downstream random number, the consideration amount commitment of the one downstream process, the cumulative value of the upstream supplier, and the cumulative value. Specifically, the consideration amount proof generation unit 107 receives, from the data acquisition unit 102, input of the cumulative consideration amount, the downstream random number, and the consideration amount commitment generated by the information management device 100 of the one downstream process. Furthermore, the consideration amount proof generation unit 107 receives, from the cumulative value management unit 103, input of the cumulative value of the upstream supplier and the cumulative value calculated by the cumulative value management unit 103. Then, the consideration amount proof generation unit 107 generates a consideration amount proof by using the cumulative consideration amount, the downstream random number, the consideration amount commitment generated by the information management device 100 of the one downstream process, the cumulative value of the upstream supplier, and the cumulative value calculated by the cumulative value management unit 103. Thereafter, the consideration amount proof generation unit 107 outputs the generated consideration amount proof to the data transmission unit 105.

The registration unit 104 receives, from the cumulative value management unit 103, input of the generated cumulative value commitment and the cumulative value proof at the time of provision of the product to the consumer P by the supply chain. Next, the registration unit 104 executes a component transaction by using the cumulative value commitment and the cumulative value proof as arguments. With this configuration, the registration unit 104 registers the cumulative value commitment and the cumulative value proof in the blockchain 300.

Furthermore, at the time of consideration distribution, the registration unit 104 receives input of the consideration amount commitment from the consideration amount commitment generation unit 108. Then, the registration unit 104 executes a remittance transaction for transmitting the consideration amount commitment to the supplier 10 of the one upstream process as a destination. With this configuration, the registration unit 104 registers the consideration amount commitment in the blockchain 300.

The data transmission unit 105 receives, from the cumulative value management unit 103, input of the cumulative value and the random number corresponding to the cumulative value at the time of provision of the product to the consumer P by the supply chain. Then, the data transmission unit 105 transmits the cumulative value and the random number corresponding to the cumulative value to the downstream information management device 100.

Furthermore, at the time of consideration distribution, the data transmission unit 105 receives, from the upstream cumulative consideration amount calculation unit 106, input of the upstream cumulative consideration amount and the random number for the upstream cumulative consideration amount. Furthermore, the data transmission unit 105 receives the consideration amount proof from the consideration amount proof generation unit 107. Then, the data transmission unit 105 transmits, to the information management device 100 of the one upstream process, the upstream cumulative consideration amount, the random number for the upstream cumulative consideration amount, and the consideration amount proof.

Figure 3:
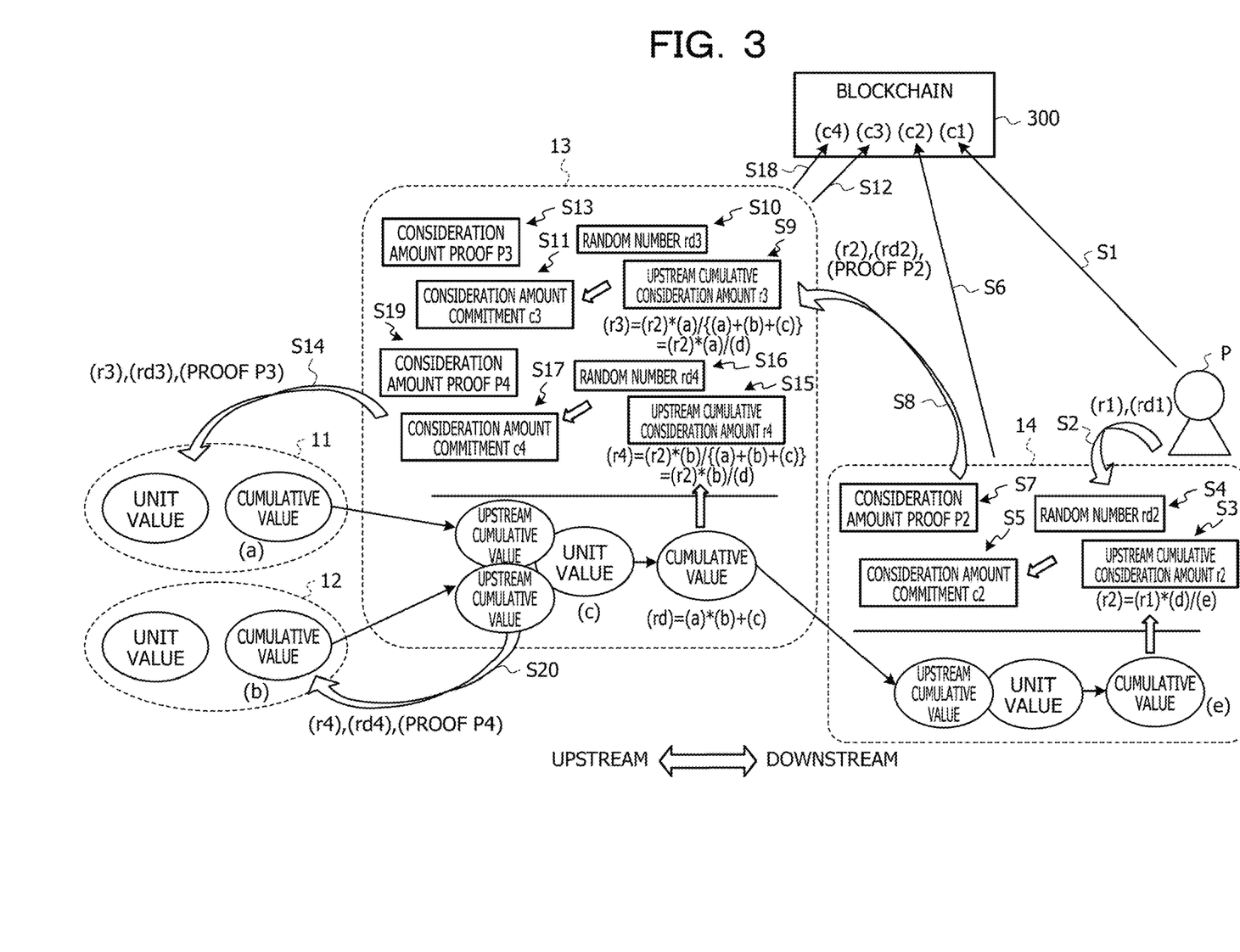
FIG. 3 is a diagram illustrating an outline of consideration validity proof processing.

FIG. 3 is a diagram illustrating an outline of consideration validity proof processing. Next, with reference to FIG. 3, an outline of consideration validity proof processing by the information management device 100, which proves validity of a consideration amount to be distributed to the upstream supplier 10 while concealing a consideration amount returned from the consumer P and cumulative value in a midway path of the distribution, will be summarized and described.

Here, a case will be described where there are the suppliers 11 to 14, the suppliers 11 and 12 provide components to the supplier 13, the supplier 13 provides a component to the supplier 14, and the supplier 14 provides a product to the consumer P. In this case, cumulative value up to the process of the supplier 11 is cumulative value a, and cumulative value up to the process of the supplier 12 is cumulative value b. Furthermore, in the process of the supplier 13, unit value is unit value c and cumulative value is cumulative value d. In other words, the cumulative value d is obtained as $(d)=(a)+(b)+(c)$. Furthermore, cumulative value up to the process of the supplier 14 is cumulative value e.

The consumer P determines to return an upstream cumulative consideration amount r1 to the product having the cumulative value e. Then, the terminal device 20 of the consumer P generates a random number rd1 for the upstream cumulative consideration amount r1, and uses the upstream cumulative consideration amount r1 and the random number rd1 as input to generate a consideration amount commitment c1 obtained by concealing the upstream cumulative consideration amount r1 by using a commitment function. Then, the terminal device 20 records the consideration amount commitment c1 in the blockchain 300 (Step S1). In FIG. 3, as the consideration amount commitment c1 indicated as (c1), symbols may be enclosed in parentheses and each piece of information may be omitted for illustration.

Next, the terminal device 20 notifies the supplier 14 of the most downstream process of the upstream cumulative consideration amount r1 and the random number rd1 (Step S2). At the supplier 14, the upstream cumulative consideration amount r1 is treated as a cumulative consideration amount up to the own process. Here, the cumulative consideration amount up to the own process in the information management device 100D of the supplier 14 is represented as the upstream cumulative consideration amount r1.

The information management device 100D of the supplier 14 acquires the upstream cumulative consideration amount r1 and the random number rd1 notified from the consumer P. Next, the information management device 100D calculates an upstream cumulative consideration amount r2 based on the held cumulative value e and the cumulative value d of the upstream supplier. Specifically, the information management device 100D calculates the upstream cumulative consideration amount r2 as $(r2)=(r1)*(d)/(e)$ (Step S3).

Next, the information management device 100D generates a random number rd2 for the upstream cumulative consideration amount r2 (Step S4).

Next, the information management device 100D uses the upstream cumulative consideration amount r2 and the random number rd2 as input to generate a consideration amount commitment c2 by using a commitment function (Step S5).

Next, the information management device 100D records the consideration amount commitment c2 in the blockchain 300 (Step S6).

Next, the information management device 100D generates a consideration amount proof P2 by using the upstream cumulative consideration amount r1, the downstream random number, the consideration amount commitment c1, the cumulative value d of the upstream supplier, and the cumulative value e notified from the consumer P (Step S7).

Thereafter, the information management device 100D notifies the supplier 13 of the upstream cumulative consideration amount r2 calculated by itself, the random number rd2, and the consideration amount proof P2 (Step S8). In FIG. 3, the consideration amount proof is simply illustrated as "proof".

The information management device 100C of the supplier 13 acquires the upstream cumulative consideration amount r2, the random number rd2, and the consideration amount proof P2 notified from the supplier 14. Next, the information management device 100C calculates an upstream cumulative consideration amount r3 based on the held cumulative value d of the own process and the cumulative value a of the supplier 11. Specifically, the information management device 100C calculates the upstream cumulative consideration amount r3 as $(r3)=(r2)*(a)/(a)+(b)+(c)=(r2)*(a)/(d)$ (Step S9).

Next, the information management device 100C generates a random number rd3 for the upstream cumulative consideration amount r3 (Step S10).

Next, the information management device 100C uses the upstream cumulative consideration amount r3 and the random number rd3 as input to generate a consideration amount commitment c3 by using a commitment function (Step S11).

Next, the information management device 100C records the consideration amount commitment c3 in the blockchain 300 (Step S12).

Next, the information management device 100C generates a consideration amount proof P3 by using the upstream cumulative consideration amount r2, the downstream random number, the consideration amount commitment c2, the cumulative value a of the supplier 11, and the cumulative value d notified from the supplier 14 (Step S13).

Thereafter, the information management device 100C notifies the supplier 11 of the upstream cumulative consideration amount r3 calculated by itself, the random number rd3, and the consideration amount proof P3 (Step S14).

Furthermore, the information management device 100C calculates an upstream cumulative consideration amount r4 based on the held cumulative value d and the cumulative value b of the supplier 12. Specifically, the information management device 100C calculates the upstream cumulative consideration amount r4 as $(r4)=(r2)*(b)/(a)+(b)+(c)=(r2)*(b)/(d)$ (Step S15).

Next, the information management device 100C generates a random number rd4 for the upstream cumulative consideration amount r4 (Step S16).

Next, the information management device 100C uses the upstream cumulative consideration amount r4 and the random number rd4 as input to generate a consideration amount commitment c4 by using a commitment function (Step S17).

Next, the information management device 100C records the consideration amount commitment c4 in the blockchain 300 (Step S18).

Next, the information management device 100C generates a consideration amount proof P4 by using the upstream cumulative consideration amount r2, the downstream random number, the consideration amount commitment c2, the cumulative value b of the supplier 12, and the cumulative value d notified from the supplier 14 (Step S19).

Thereafter, the information management device 100C notifies the supplier 12 of the upstream cumulative consideration amount r4 calculated by itself, the random number rd4, and the consideration amount proof P4 (Step S20).

In this case, the suppliers 11 to 13 may verify that the received cumulative consideration amounts are true by each of the consideration amount proofs P2 to P4 acquired from the supplier 10 of the one downstream process.

Figure 4:
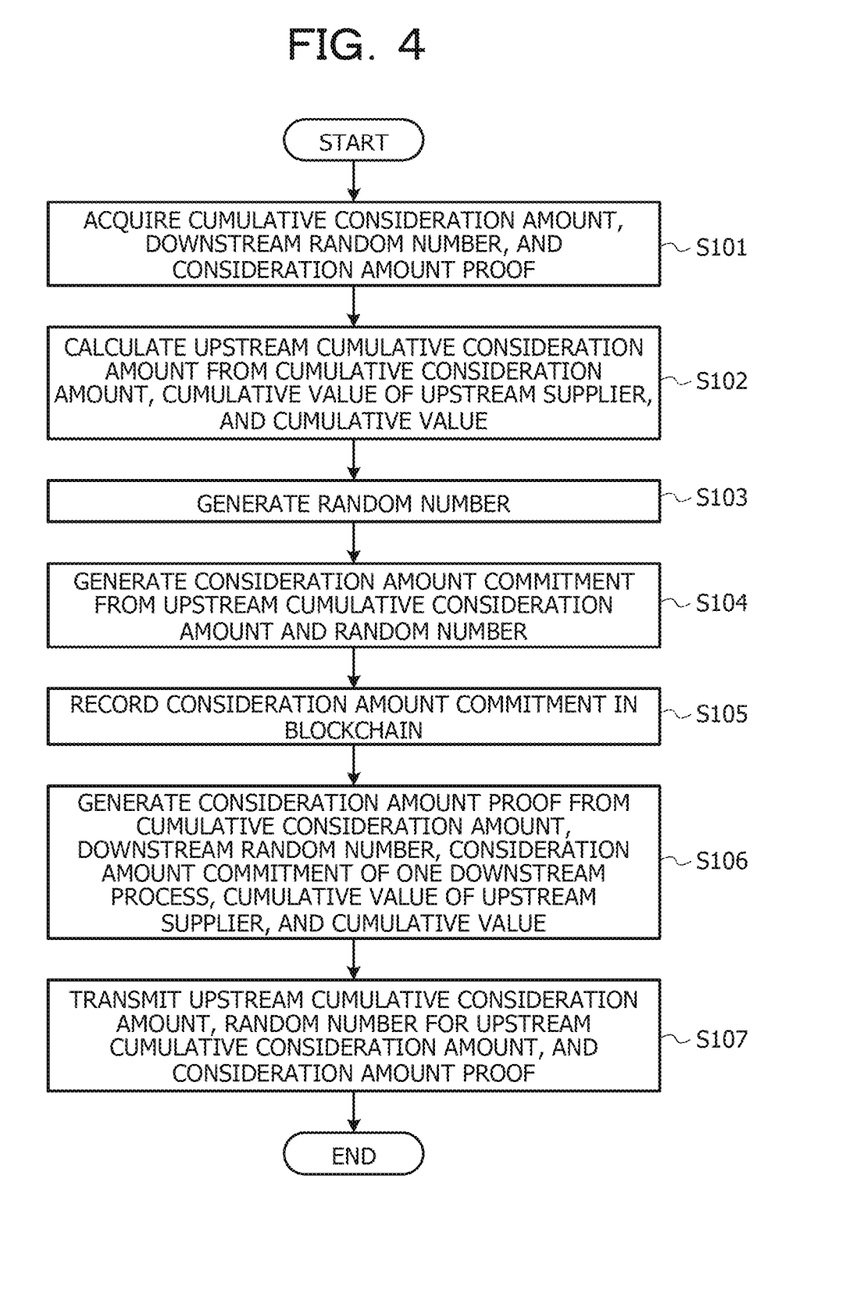
FIG. 4 is a flowchart of the consideration validity proof processing.

FIG. 4 is a flowchart of the consideration validity proof processing. Next, a flow of the consideration validity proof processing by the information management device 100 will be described with reference to FIG. 4.

The data acquisition unit 102 acquires a cumulative consideration amount, a random number, and a consideration amount proof notified from the supplier 10 of one downstream process (Step S101). Then, the data acquisition unit 102 outputs the cumulative consideration amount and the consideration amount proof to the upstream cumulative consideration amount calculation unit 106. Furthermore, the data acquisition unit 102 outputs, to the consideration amount proof generation unit 107, the cumulative consideration amount, a downstream random number, and a consideration amount commitment generated by the information management device 100 of the one downstream process. Here, in the case of the information management device 100 of the most downstream process, the data acquisition unit 102 does not need to acquire the consideration amount proof.

The upstream cumulative consideration amount calculation unit 106 calculates an upstream cumulative consideration amount based on the cumulative consideration amount, cumulative value of an upstream supplier, and cumulative value up to the own process (Step S102). Then, the upstream cumulative consideration amount calculation unit 106 outputs the upstream cumulative consideration amount to the data transmission unit 105 and the consideration amount commitment generation unit 108.

Next, the consideration amount commitment generation unit 108 generates a random number for the upstream cumulative consideration amount calculated by the upstream cumulative consideration amount calculation unit 106 (Step S103).

Next, the consideration amount commitment generation unit 108 uses the upstream cumulative consideration amount and the random number for the upstream cumulative consideration amount as input to generate a consideration amount commitment by using a commitment function (Step S104). Then, the consideration amount commitment generation unit 108 outputs the generated consideration amount commitment to the registration unit 104.

The registration unit 104 records the consideration amount commitment generated by the consideration amount commitment generation unit 108 in the blockchain 300 (Step S105).

Next, the consideration amount proof generation unit 107 acquires, from the blockchain 300, the consideration amount commitment registered by the information management device 100 of one upstream process. Next, the consideration amount proof generation unit 107 generates a consideration amount proof by using the cumulative consideration amount, the downstream random number, the consideration amount commitment of the one downstream process, the cumulative value of the upstream supplier, and the cumulative value up to the own process (Step S106). Then, the consideration amount proof generation unit 107 outputs the generated consideration amount proof to the data transmission unit 105.

The data transmission unit 105 notifies the one upstream supplier 10 of the upstream cumulative consideration amount calculated by the upstream cumulative consideration amount calculation unit 106 and the random number for the upstream cumulative consideration amount, and the consideration amount proof generated by the consideration amount proof generation unit 107 (Step S107).

As described above, the information management device according to the present embodiment registers, in the blockchain, the consideration amount commitment obtained by concealing the calculated cumulative consideration amount from the most upstream process to the one upstream process. Moreover, the information management device notifies the supplier of the one upstream process of the consideration amount proof, which is a zero knowledge proof proving that the cumulative consideration amount up to the one upstream process is valid, together with the cumulative consideration amount from the most upstream process up to one upstream process. By using the consideration amount proof, the one upstream supplier may confirm that the distributed cumulative consideration amount is valid without knowing the cumulative consideration amount returned by the consumer and all the cumulative consideration amounts in the middle of distribution. With this configuration, it is possible to perform appropriate consideration distribution while concealing the cumulative consideration amount in each process. Therefore, it is possible to ensure privacy and reliability of the supply chain.

(Hardware Configuration)

Figure 5:
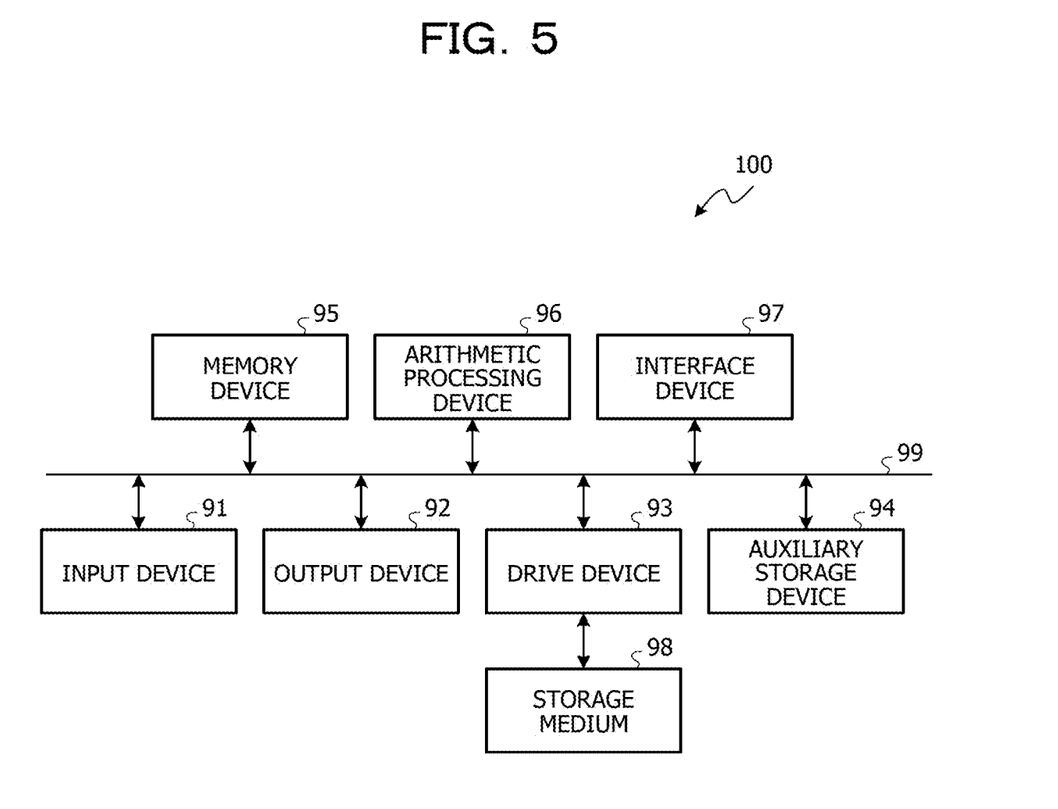
FIG. 5 is a hardware configuration diagram of the information management device.

FIG. 5 is a hardware configuration diagram of the information management device. Next, a hardware configuration of the information management device 100 according to the embodiment will be described with reference to FIG. 5.

The information management device 100 of the present embodiment is an information processing device including an input device 91, an output device 92, a drive device 93, an auxiliary storage device 94, a memory device 95, an arithmetic processing device 96, and an interface device 97 that are coupled to each other via a bus 99.

The input device 91 is a device for inputting various types of information, and the output device 92 is a device for outputting various types of information. The interface device 97 includes a local area network (LAN) card and the like, and is used for coupling to a network.

An information concealment program included in the information management device 100 is at least a part of various programs included in the information management device 100.

These programs are provided by, for example, distribution of a storage medium 98, download from a network, or the like. Furthermore, as the storage medium 98 that records these programs, it is possible to use various types of storage media such as storage media that optically, electrically, or magnetically record information such as a compact disk-read only memory (CD-ROM), a flexible disk, or a magneto-optical disc, and a semiconductor memory that electrically records information such as a ROM or a flash memory.

Furthermore, when the storage medium 98 that records these is set in the drive device 93, the information concealment program is installed from the storage medium 98 to the auxiliary storage device 94 via the drive device 93. The information concealment program downloaded from the network is installed to the auxiliary storage device 94 via the interface device 97.

The auxiliary storage device 94 stores the installed program, and also stores files, data, and the like that are needed. The arithmetic processing device 96 reads various programs from the auxiliary storage device 94 at startup of the information management device 100, and develops and stores the various programs in the memory device 95. Then, the arithmetic processing device 96 implements the functions of the cumulative consideration acquisition unit 101, the data acquisition unit 102, the cumulative value management unit 103, and the registration unit 104 exemplified in FIG. 2 by executing the programs stored in the memory device 95. Furthermore, the arithmetic processing device 96 implements the functions of the data transmission unit 105, the upstream cumulative consideration amount calculation unit 106, the consideration amount proof generation unit 107, and the consideration amount commitment generation unit 108.

The supply chain system described in the embodiment described above is applicable to any supply chain in which an object acquired from an upstream process is modified to add additional value and passed to a downstream process. Examples of the applicable supply chain include a supply chain in which a machine component is added to manufacture a product, a supply chain related to software in which subcomponents are sequentially added in each process, and the like. Besides, the applicable supply chain may be a supply chain related to publication in which a manuscript is arranged and passed to the next, and the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing an information management program that causes at least one computer to execute a process, the process comprising:

acquiring a first cumulative consideration amount from a most upstream process in a plurality of processes included in a supply chain to a first process of the plurality of processes based on a second cumulative consideration amount from the most upstream process to the first process, a first cumulative value from the most upstream process to the first process, and a second cumulative value from the most upstream process to a second process which is one upstream process of the first process;

generating a consideration amount commitment by concealing the first cumulative consideration amount by using a random number;

registering the consideration amount commitment in a blockchain;

generating a consideration amount proof that is a zero knowledge proof that proves validity of the second cumulative consideration amount without disclosing the second cumulative consideration amount; and notifying the second process of the second cumulative consideration amount, the random number, and the consideration amount proof.

2. The non-transitory computer-readable storage medium according to claim 1, wherein the process further comprising:

acquiring a downstream consideration amount commitment obtained by concealing the second cumulative consideration amount from the blockchain;

acquiring, from a third process which is one downstream process of the first process, the second cumulative consideration amount, a downstream random number used to generate the downstream consideration amount commitment, and a downstream consideration amount proof that is a zero knowledge proof of validity of the second cumulative consideration amount; and generating the consideration amount proof based on the second cumulative consideration amount, the downstream random number, the first cumulative value, the second cumulative value, and the downstream consideration amount commitment.

3. The non-transitory computer-readable storage medium according to claim 2, wherein the process further comprising:
acquiring the first cumulative value by adding a value in the first process to the second cumulative value.

4. The non-transitory computer-readable storage medium according to claim 3, wherein the process further comprising:
generating a first cumulative value commitment by concealing the first cumulative value;
generating a cumulative value proof that is a zero knowledge proof that indicates validity of the first cumulative value, the cumulative value proof being based on the first cumulative value commitment; and
registering the cumulative value proof in the blockchain.

5. An information management method for a computer to execute a process comprising:
acquiring a first cumulative consideration amount from a most upstream process in a plurality of processes included in a supply chain to a first process of the plurality of processes based on a second cumulative consideration amount from the most upstream process to the first process, a first cumulative value from the most upstream process to the first process, and a second cumulative value from the most upstream process to a second process which is one upstream process of the first process;
generating a consideration amount commitment by concealing the first cumulative consideration amount by using a random number;
registering the consideration amount commitment in a blockchain;
generating a consideration amount proof that is a zero knowledge proof that proves validity of the second cumulative consideration amount without disclosing the second cumulative consideration amount; and
notifying the second process of the second cumulative consideration amount, the random number, and the consideration amount proof.

6. The information management method according to claim 5, wherein the process further comprising:
acquiring a downstream consideration amount commitment obtained by concealing the second cumulative consideration amount from the blockchain;
acquiring, from a third process which is one downstream process of the first process, the second cumulative consideration amount, a downstream random number used to generate the downstream consideration amount commitment, and a downstream consideration amount proof that is a zero knowledge proof of validity of the second cumulative consideration amount; and
generating the consideration amount proof based on the second cumulative consideration amount, the downstream random number, the first cumulative value, the second cumulative value, and the downstream consideration amount commitment.

7. The information management method according to claim 6, wherein the process further comprising:
acquiring the first cumulative value by adding a value in the first process to the second cumulative value.

8. The information management method according to claim 7, wherein the process further comprising:
generating a first cumulative value commitment by concealing the first cumulative value;
generating a cumulative value proof that is a zero knowledge proof that indicates validity of the first cumulative value, the cumulative value proof being based on the first cumulative value commitment; and
registering the cumulative value proof in the blockchain.

9. An information management device comprising:
one or more memories; and
one or more processors coupled to the one or more memories and the one or more processors configured to:
acquire a first cumulative consideration amount from a most upstream process in a plurality of processes included in a supply chain to a first process of the plurality of processes based on a second cumulative consideration amount from the most upstream process to the first process, a first cumulative value from the most upstream process to the first process, and a second cumulative value from the most upstream process to a second process which is one upstream process of the first process,
generate a consideration amount commitment by concealing the first cumulative consideration amount by using a random number,
register the consideration amount commitment in a blockchain,
generate a consideration amount proof that is a zero knowledge proof that proves validity of the second cumulative consideration amount without disclosing the second cumulative consideration amount, and
notify the second process of the second cumulative consideration amount, the random number, and the consideration amount proof.

10. The information management device according to claim 9, wherein the one or more processors are further configured to:
acquire a downstream consideration amount commitment obtained by concealing the second cumulative consideration amount from the blockchain,
acquire, from a third process which is one downstream process of the first process, the second cumulative consideration amount, a downstream random number used to generate the downstream consideration amount commitment, and a downstream consideration amount proof that is a zero knowledge proof of validity of the second cumulative consideration amount, and
generate the consideration amount proof based on the second cumulative consideration amount, the downstream random number, the first cumulative value, the second cumulative value, and the downstream consideration amount commitment.

11. The information management device according to claim 10, wherein the one or more processors are further configured to acquire the first cumulative value by adding a value in the first process to the second cumulative value.

12. The information management device according to claim 11, wherein the one or more processors are further configured to:

generate a first cumulative value commitment by concealing the first cumulative value, generate a cumulative value proof that is a zero knowledge proof that indicates validity of the first cumulative value, the cumulative value proof being based on the first cumulative value commitment, and registering the cumulative value proof in the blockchain.

* * * * *